(12) United States Patent
Mrusek et al.

(10) Patent No.: US 12,145,434 B2
(45) Date of Patent: Nov. 19, 2024

(54) COOLING DEVICE FOR A FRONT END OF A MOTOR VEHICLE, AND MOTOR VEHICLE

(71) Applicant: Volkswagen Aktiengesellschaft, Wolfsburg (DE)

(72) Inventors: Falk Mrusek, Wendeburg (DE); Johannes Schwarz, Sassenburg (DE); Martin Frevert, Wittingen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 314 days.

(21) Appl. No.: 17/637,408

(22) PCT Filed: Aug. 18, 2020

(86) PCT No.: PCT/EP2020/073134
§ 371 (c)(1),
(2) Date: Feb. 22, 2022

(87) PCT Pub. No.: WO2021/032756
PCT Pub. Date: Feb. 25, 2021

(65) Prior Publication Data
US 2022/0281312 A1    Sep. 8, 2022

(30) Foreign Application Priority Data
Aug. 22, 2019   (DE) .................... 10 2019 212 551.4

(51) Int. Cl.
*B60K 11/04* (2006.01)
*B60K 11/08* (2006.01)

(52) U.S. Cl.
CPC .............. *B60K 11/04* (2013.01); *B60K 11/08* (2013.01)

(58) Field of Classification Search
CPC ....... B60K 11/04; B60K 11/08; B60K 11/085; Y02T 10/88; F28F 19/002; F28F 2265/02;
(Continued)

(56) References Cited

U.S. PATENT DOCUMENTS 4,756,279 A * 7/1988 Temmesfeld ............ F01P 11/10
                                                    123/41.04
9,744,846 B2 * 8/2017 Schmidt ............... B60K 11/085
(Continued)

FOREIGN PATENT DOCUMENTS

CN    101484671 A    7/2009
CN    102198792 A    9/2011
(Continued)

OTHER PUBLICATIONS

International Search Report for International Patent Application No. PCT/EP2020/073134, mailed Nov. 6, 2020.
(Continued)

*Primary Examiner* — James A Shriver, II
*Assistant Examiner* — Ian Bryce Shelton
(74) *Attorney, Agent, or Firm* — PEARL COHEN ZEDEK LATZER BARATZ LLP

(57) ABSTRACT

A cooling device for a front end of a motor vehicle has a heat exchanger which has a large number of coolant channels around which air can flow, and an apparatus which is connected upstream of the heat exchanger and has a support frame having a through-flow opening for air to flow to the heat exchanger, and at least one closing element that is movably mounted on the support frame and is intended to open, partially open, and close the through-flow opening. The closing element is designed as a pull-down shade which extends so as to close the through-flow opening in a first end position over the support frame and completely opens the
(Continued)

through-flow opening in a second, rolled-up end position, and the support frame has a lattice supporting structure which is located in the through-flow opening and comprises intersecting struts.

15 Claims, 2 Drawing Sheets

(58) Field of Classification Search
CPC ........ F28F 2265/30; F28F 9/001; F28F 9/002; F28F 9/00
See application file for complete search history.

(56) References Cited

U.S. PATENT DOCUMENTS

| | | | |
|---|---|---|---|
| 11,566,857 B2 * | 1/2023 | Godzina | ............... F28F 19/002 |
| 2006/0211364 A1 | 9/2006 | Brotz et al. | |
| 2010/0218497 A1 | 9/2010 | Pettersson et al. | |
| 2011/0232865 A1 * | 9/2011 | Mildner | .................... F01P 7/10 165/96 |
| 2015/0183313 A1 | 7/2015 | Brückner | |
| 2015/0246608 A1 * | 9/2015 | Schmidt | ................ B60K 11/04 160/309 |
| 2019/0009667 A1 * | 1/2019 | Steffen | ...................... F01P 7/12 |
| 2021/0364240 A1 * | 11/2021 | Godzina | ............... F28F 19/002 |

FOREIGN PATENT DOCUMENTS

| | | | | |
|---|---|---|---|---|
| CN | 104245385 A | | 12/2014 | |
| CN | 108656941 A | | 10/2018 | |
| DE | 3446950 C1 | | 5/1986 | |
| DE | 102 35 192 A1 | | 3/2003 | |
| DE | 10 2008 056766 A1 | | 5/2010 | |
| DE | 10 2012 109503 A1 | | 4/2014 | |
| DE | 102013103377 A1 | * | 10/2014 | ............. B60K 11/04 |
| DE | 102014109342 A1 | * | 1/2016 | ........... B60K 11/085 |
| DE | 102015010102 A1 | * | 2/2017 | |
| DE | 10 2018 108162 A1 | | 10/2019 | |
| EP | 2 602 144 A1 | | 6/2013 | |
| EP | 3435020 A1 | * | 1/2019 | ............ F28F 19/002 |
| EP | 3457071 A1 | * | 3/2019 | ............ F28F 19/002 |
| GB | 2479044 A | * | 9/2011 | ............ B60K 11/085 |
| WO | WO-2014053567 A1 | * | 4/2014 | ............. B60K 11/04 |
| WO | WO-2016059766 A1 | * | 4/2016 | ................ B60H 1/32 |
| WO | WO-2019020505 A1 | * | 1/2019 | ............ F28F 19/002 |
| WO | WO-2019053278 A1 | * | 3/2019 | ............ F28F 19/002 |

OTHER PUBLICATIONS

Search Report for German Patent Application No. 10 2019 212 551.4, mailed Aug. 13, 2020.
Search Report for Chinese Patent application No. 202080059378.2, dated Jun. 30, 2024.

* cited by examiner

COOLING DEVICE FOR A FRONT END OF A MOTOR VEHICLE, AND MOTOR VEHICLE

CROSS-REFERENCE TO RELATED APPLICATIONS

This application is a National Phase Application of PCT International Application No. PCT/EP2020/073134, International Filing Date Aug. 18, 2020, claiming the priority of German Patent Application No. 10 2019 212 551.4, filed Aug. 22, 2019, which is hereby incorporated by reference.

FIELD OF THE INVENTION

The invention relates to a cooling device for a front end of a motor vehicle, comprising at least one heat exchanger which has a plurality of coolant channels around which air can flow, and comprising an apparatus which is connected upstream from the heat exchanger and which has a support frame with a through-flow opening for air to flow to the heat exchanger, and comprising at least one closing element that is movably mounted on the support frame and that is intended to open, partially open, and close the through-flow opening.

Moreover, the invention relates to a motor vehicle having the cooling device described above.

BACKGROUND OF THE INVENTION

Cooling devices of the above-mentioned type are known from the state of the art. For instance, European patent application EP 2 602 144 A1 describes a vehicle front end that has a cooler area and an air flap fixture with a support frame arranged in front of the cooler area as well as with pivoting lamellae incorporated therein for regulating an airflow. By adjusting the lamellae, it is possible to restrict, prevent or allow the air to flow to a heat exchanger. In this manner, flow losses that occur during flow through the engine compartment or around the heat exchanger can be avoided whenever the airflow is not needed for cooling. This entails, for example, advantages in terms of the drag coefficient (cd) of the motor vehicle equipped with this cooling device. By completely closing the through-flow opening, for example, a targeted airflow pattern of the driving headwind past the vehicle is achieved, as a result of which a reduced dynamic pressure arises at the front end, which translates, for instance, into advantages in terms of the energy efficiency.

The invention is based on the objective of creating an improved cooling device that has a simple design and a sturdy configuration so that it can withstand the dynamic pressure, for example, even at high driving speeds.

SUMMARY OF THE INVENTION

The objective upon which the invention is based is achieved by a cooling device. This has the advantage that the closing element itself has a weight-saving configuration and advantageously creates a seal, and also that an advantageous design of the support frame ensures that damage to the closing element or to the cooling device is simply and reliably prevented.

According to the invention, this is achieved in that the closing element is configured as a roller blind which, in a first end position, extends over the support frame so as to close the through-flow opening and, in a second, rolled-up end position, it completely opens the through-flow opening, and in that the support frame has a grid supporting structure that is located in the through-flow opening and has intersecting struts, in particular vertical struts and horizontal struts, for the roller blind. In other words, the cooling device according to the invention puts forward a roller blind as the closing element. In the end position, which completely closes the through-flow opening, the roller blind tightly seals the through-flow opening. This is ensured by the flexible, particularly pliable roller blind. The grid supporting structure prevents the roller blind from being pushed through the through-flow opening, as a result of which the sealing function of the roller blind is reliably retained in the closing position, even in case of strong headwinds or in case of high flow pressure acting upon the roller blind. In this manner, the roller blind as well as the heat exchanger, which is located behind the roller blind as seen in the direction of flow, are protected from being damaged. If the roller blind is moved into the second end position so that the through-flow opening is completely opened, then the airflow can pass through the grid supporting structure and can reach the heat exchanger. Advantageously, the grid supporting structure is configured so as to be flow-optimized, so that the airflow advantageously passes through the grid supporting structure, especially in such a way that little or no turbulence occurs. This is achieved in that the cross sections of the vertical struts and the horizontal struts have an advantageous drop-shaped profile.

According to another preferred refinement of the invention, the grid supporting structure has at least one plate-shaped support element on the side of the grid supporting structure facing away from the roller blind in order to establish contact with the heat exchanger. The support element ensures a secure contact of the grid supporting structure on the heat exchanger for the eventuality that the flow pressure is so high that the roller blind deforms the grid supporting structure in the direction of the heat exchanger. The plate-shaped support element ensures full-surface contact of the grid supporting structure with the heat exchanger, thereby avoiding that the grid supporting structure exerts a punctual pressure load on the heat exchanger. The full-surface contact ensures an improved transmission of force from the grid supporting structure to the heat exchanger in such a way that damage to the heat exchanger is prevented. In particular, the support element is designed to be wider than the struts of the grid supporting structure in order to ensure an improved contact on the heat exchanger.

Preferably, the grid supporting structure has several such support elements on the side facing away from the roller blind, so that the grid supporting structure can be supported in several places on the heat exchanger without damaging it. The appertaining support element especially has a contact surface that extends over several coolant channels of the heat exchanger. In particular, the appertaining support element has a circular contact surface.

In particular, the appertaining support element is arranged at an intersection site of the horizontal struts and the vertical struts in order to ensure an optimal force transmission from the grid supporting structure to the heat exchanger. Especially preferably, the appertaining support element, as seen in a longitudinal view, has a flow-optimized contour up to the contact surface, so that the appertaining support element offers the least possible flow resistance. In particular, starting from the grid supporting structure in the direction of the contact surface, the appertaining support element widens continuously with a drop-shaped profile, in order to hinder the airflow as little as possible when the through-flow opening is open. The contact surface of the appertaining support element is advantageously configured to be larger than the side surface of the appertaining horizontal and vertical struts associated with the heat exchanger.

According to a preferred refinement of the invention, at least one horizontal strut and/or vertical strut is/are configured as a metal strut. The metal strut translates into advantageous sturdiness and stiffens the support frame and the grid supporting structure in an advantageous manner.

Moreover, at least one horizontal strut and/or vertical strut is preferably configured as a plastic strut. A plastic strut reduces the weight of the apparatus and permits cost-effective production.

Preferably, the support frame is at least essentially made of plastic and it is especially configured in one piece together with at least some of the plastic struts. This results in a highly integral component that allows easy assembly and that has a low weight. The one-piece design also increases the sturdiness of the apparatus.

According to a preferred embodiment of the invention, at least one metal strut is at least partially surrounded by the plastic of the support frame and/or of a plastic strut, especially encapsulated by injection molding. This ensures an advantageous integration of the metal strut into the apparatus.

Preferably, at least one metal strut has at least one cutout through which the plastic material of a plastic strut and/or of the support frame extends. This ensures an advantageous positive-fit connection of the metal strut and the plastic material of the support frame and/or of the plastic strut. Especially preferably, the material of a plastic strut, which extends perpendicular to the metal strut, extends in the intersection area through the cutout of the metal strut in order to ensure a particularly strong connection.

Furthermore, it is preferably provided for at least one plate-like support element to be arranged in the area of the cutout of a horizontal strut. In this manner, the support element provides an advantageous flow of force through the grid supporting structure to the support element and optionally also to the heat exchanger. This advantageously ensures a secure contact and protection for the heat exchanger as well as for the grid supporting structure.

Preferably, the appertaining support element is configured in one piece with a plastic strut of the grid supporting structure. This allows a cost-effective production as well as installation of the support element on the grid supporting structure. In particular, the support element is shaped together with the plastic strut and is especially shaped directly onto a metal strut in order to ensure an advantageous joining of the support element to the metal strut, especially in the area of the cutout.

Moreover, at least some of the several support elements preferably have differently sized contact surfaces for the heat exchanger. As a result, the contact surfaces are adapted, for example, to the construction of the heat exchanger, in order to ensure optimal contact sites or contact areas. Optionally, the contact surfaces are also selected as a function of the airflow in such a way that the entire airflow is advantageously distributed over or directed towards the heat exchanger.

Moreover, a water cooler with cooling channels around which air can flow is preferably arranged on the side of the apparatus facing away from the air-conditioning condenser. Thus, the apparatus is situated between the water cooler and the heat exchanger, which is particularly configured as an air-conditioning condenser, so that the airflow only passes through the through-flow opening after having passed through the water cooler and is then fed to the heat exchanger or to the air-conditioning condenser. This yields a particularly compact design of the cooling device with an advantageous placement of the roller blind between the air-conditioning condenser and the water cooler.

Moreover, it is preferably provided for the roller blind to have a winding roller, which is rotatably mounted on the support frame. Consequently, the roller blind is held on the support frame itself and can be rolled up and down by means of the winding roller in order to open or close the through-flow opening. The arrangement of the roller blind on the support frame itself permits a simple assembly of the cooling device, especially an advantageous pre-assembly of the apparatus.

The motor vehicle according to the invention is characterized by the cooling device according to the invention. This results in the advantages already mentioned.

BRIEF DESCRIPTION OF THE DRAWINGS

Additional advantages and preferred features ensue from the description above as well as from the claims. Below, the invention will be explained in greater detail on the basis of the drawing. The following is shown:

DETAILED DESCRIPTION OF THE INVENTION

Figure 1:
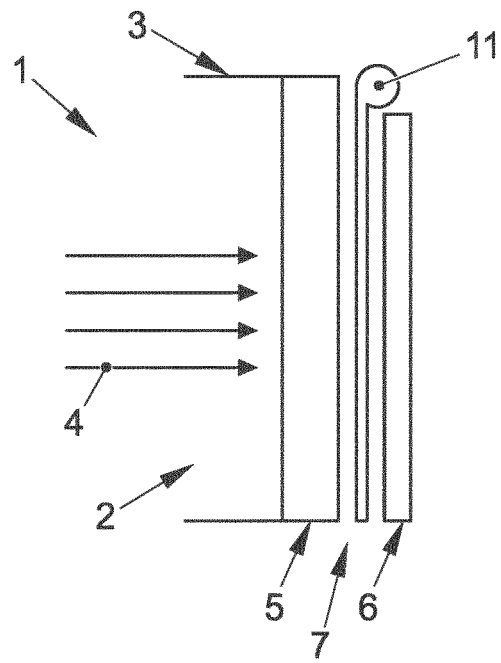
FIG. 1 a cooling device of a motor vehicle in a simplified side view.

FIG. 1 shows a simplified side view of an advantageous cooling device 1 that is associated with an air intake opening 2 of a front end of a motor vehicle 3, which is merely mentioned here. The cooling device 1 extends over the air intake opening 2 so that driving headwind, which is indicated by arrows 4 in FIG. 1, flows through the cooling device 1 before reaching, for example, the engine compartment of the motor vehicle 3.

According to the present embodiment, the cooling device 1 has a water cooler 5 with a plurality of coolant channels through which cooling water can flow, an air-conditioning condenser 6 having a plurality of coolant channels through which a coolant can be conveyed, as well as an apparatus 7 that is arranged in the direction of flow between the water cooler 5 and the air-conditioning condenser 6 and that serves to influence the airflow through the cooling device 1.

Figure 2:
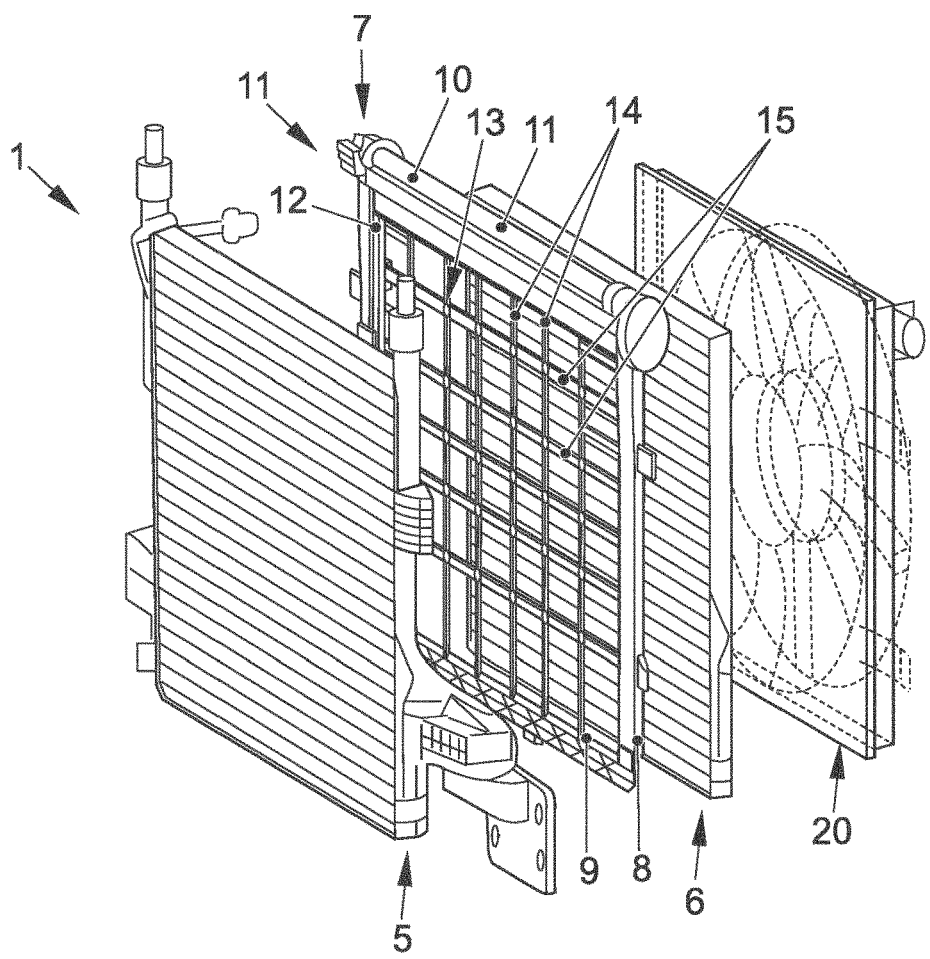
FIG. 2 the cooling device in a simplified exploded view.

FIG. 2 shows a perspective exploded view of the cooling device 1. Optionally, the cooling device 1 also has a fan 20 that is situated in the direction of flow behind the air-conditioning condenser 6 and that has at least one actuatable impeller for generating an airflow when there is no driving headwind.

The apparatus 7 has a support frame 8 with a through-flow opening 9 through which the airflow can be conveyed to the air-conditioning condenser 6. The support frame 8 also has a roller blind 10 that can be rolled up onto and down from a winding roller 11 that is rotatably mounted at the top of the support frame 8 in such a way that the roller blind 10 extends completely along the support frame 8, thereby covering the through-flow opening 9 and closing it off. Thus, the roller blind 10 is made of a flexible, especially pliable material, for example, a textile, so that it reliably and especially tightly closes off the through-flow opening 9. Here, the roller blind 10 is guided on both sides, for example, in side guide grooves 12 of the support frame 8.

In order to prevent deformation of the roller blind in the state in which it has closed off the through-flow opening 9, the support frame 8 has a grid supporting structure 13 that extends over the through-flow opening 9 and that is situated downstream from the roller blind 10 when the latter is in its rolled-down state, so that, when there is driving headwind, the roller blind is pressed against the grid supporting structure 13. The grid supporting structure 13 has vertical struts 14 that extend vertically when it is being used properly, and it also has horizontal struts 15 that intersect with the vertical struts 14 and that extend horizontally when it is being used properly or else during installation of the cooling device 1. According to an alternative embodiment, not shown here, the struts can also be configured or arranged in such a slanted manner that they form a rhombic pattern. Other types and orientations of the struts relative to each other can also be effective.

Figure 3:
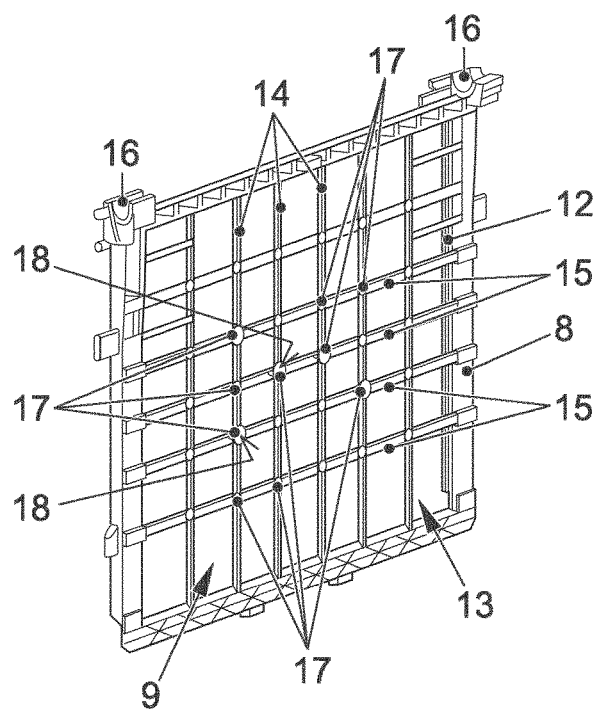
FIG. 3 a support frame of the cooling device in a perspective view.

FIG. 3 shows a perspective view of a support frame 8 with the grid supporting structure 13 as seen towards the back of the support frame 8 facing the air-conditioning condenser 6. Here, the support frame 8 is shown without the roller blind 10, whereby, at the upper end, mounting receptacles 16 are formed for the drive shaft of the winding roller 11 of the roller blind 10.

According to the present embodiment, at least most of the horizontal struts 15 are made of metal, especially of steel. The other struts, especially the vertical struts 14 as well as the support frame 8 itself, are made of plastic in this case. In particular, the vertical struts 14 as well as the support frame 8 are configured in one piece with each other. In particular, the horizontal struts 15 or the steel struts or the metal struts are integrated into the support frame 8 and the vertical struts 14 are integrated into the plastic material in that they are encapsulated by means of injection molding. Advantageously, the horizontal struts 15 made of metal are integrated at the end into the support frame 8 or else they are encapsulated with the material of the support frame 8 by means of injection molding.

At a number of intersections where the vertical struts 14 intersect with the horizontal struts 15, the grid supporting structure 13 has plate-like support elements 17 that are arranged on the side facing away from the roller blind 10, in other words, facing the air-conditioning condenser 6. The support elements 17 have different sizes and each have a contact surface 18, a few of which have been designated with reference numerals for the sake of clarity. The contact surfaces 18 are advantageously situated in a shared plane and are each of such a size that they extend over several coolant channels of the air-conditioning condenser 6.

The support elements serve to support the grid supporting structure 13 on the air-conditioning condenser 6, which is situated behind the grid supporting structure 13, when there is strong driving headwind acting against the roller blind and/or against the grid supporting structure 13. The advantageous size of the contact surfaces 18 ensures that the contact pressure is distributed over an enlarged surface area, thereby protecting the coolant channels of the air-conditioning condenser 6 against damage, especially caused by the horizontal struts 15 that are made of metal.

Figure 4:
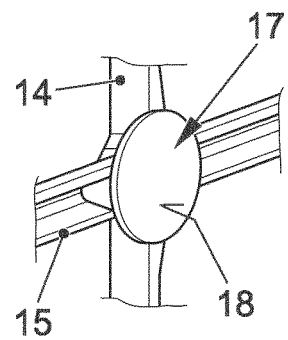
FIG. 4 a perspective detailed view of the support frame.

FIG. 4 shows an enlarged perspective view of an intersection in which a vertical strut 14 intersects with a horizontal strut 15. The plastic material of the vertical strut 14 here is injection-molded around the horizontal strut 15 so that the vertical strut 14 is securely integrated into the grid supporting structure 13 with the vertical strut 14.

Figure 5:
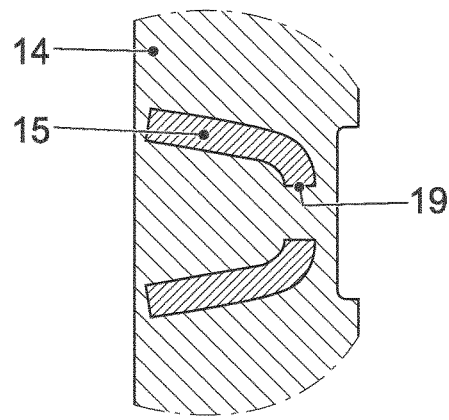
FIG. 5 a sectional view through the advantageous support frame.

On the basis of a longitudinal view along the vertical strut 14 of FIG. 4, FIG. 5 shows that the horizontal strut 15 also has a cutout 19 in the area of the intersection through which the plastic material of the vertical strut 14 penetrates, so that, on the one hand, the horizontal strut 15 is completely surrounded by the material of the vertical strut 14 and, on the other hand, it is also penetrated by the material. As a result, a particularly strong connection of horizontal struts 15 and vertical struts 14 is created. In particular, one of the support elements 17 is arranged in the area of the intersection, as shown in FIG. 4. Consequently, the support element 17 is situated in an especially advantageous area of the grid supporting structure 13 and, if needed, ensures an advantageous transmission of force to the heat exchanger or to the air-conditioning condenser 6. Although the support elements 17 have a circular configuration or have a circular contact surface 18 in the present embodiment, the configuration of the support elements 17 is not necessarily limited to this circular shape. Rather, the appertaining support element 17 can also have a square, triangular, polygonal or oval shape.

Advantageously, the support struts 15 made of metal can have a V-shaped or U-shaped cross section, whereby the V-shape or U-shape is open in the direction of the air-conditioning condenser 6, that is to say, away from the roller blind 10, in order to advantageously ensure the sturdiness of the grid supporting structure 13.

The advantageous configuration of the support frame 8 with the grid supporting structure 13 offers a compact pre-assembly unit as well as a compact configuration of the apparatus 7, thereby allowing a simple and cost-effective production and assembly of the cooling device 1.

LIST OF REFERENCE NUMERALS 1 cooling device
2 air intake opening
3 motor vehicle
4 arrow
5 water cooler
6 air-conditioning condenser
7 apparatus
8 support frame
9 through-flow opening
10 roller blind
11 winding roller
12 guide groove
13 grid supporting structure
14 vertical strut
15 horizontal strut
16 mounting receptacle
17 support element
18 contact surface
19 cutout
20 fan

The invention claimed is:

1. A cooling device for a front end of a motor vehicle, comprising:
at least one heat exchanger which has a plurality of coolant channels around which air can flow,
an apparatus which is connected upstream from the heat exchanger and which has a support frame having a through-flow opening for air to flow to the heat exchanger, and at least one closing element that is movably mounted on the support frame and that is intended to open, partially open, and close the through-flow opening, wherein the closing element is configured as a roller blind which, in a first end position, extends over the support frame so as to close the through-flow opening, and which, in a second, rolled-up end position, completely opens the through-flow opening, wherein the support frame has a grid supporting structure that is located in the through-flow opening and has intersecting struts for the roller blind, wherein the grid supporting structure has at least one plate-shaped support element on the side of the grid supporting structure comprising a planar contact surface and facing away from the roller blind in order to establish contact with the heat exchanger.

2. The cooling device according to claim 1, wherein the at least one plate-shaped support elements establish contact with the heat exchanger.

3. The cooling device according to claim 1, wherein the at least one plate-shaped support element is arranged at an intersection site of two struts.

4. The cooling device according to claim 1, wherein the intersecting struts comprise at least one horizontal strut and at least one vertical strut.

5. The cooling device according to claim 1, wherein the intersecting struts are configured as metal or plastic struts.

6. The cooling device according to claim 1, wherein the support frame is at least essentially made of plastic and is configured in one piece together with at least one plastic strut.

7. The cooling device according to claim 6, wherein the support frame comprises at least one metal strut that is at least partially surrounded by the plastic of the support frame and/or of a plastic strut.

8. A cooling device for a front end of a motor vehicle, comprising:
at least one heat exchanger which has a plurality of coolant channels around which air can flow,
an apparatus which is connected upstream from the heat exchanger and which has a support frame having a through-flow opening for air to flow to the heat exchanger, and
at least one closing element that is movably mounted on the support frame and that is intended to open, partially open, and close the through-flow opening, wherein the closing element is configured as a roller blind which, in a first end position, extends over the support frame so as to close the through-flow opening, and which, in a second, rolled-up end position, completely opens the through-flow opening, and wherein the support frame has a grid supporting structure that is located in the through-flow opening and has intersecting struts for the roller blind, wherein the support frame is at least essentially made of plastic and is configured in one piece together with at least one plastic strut, wherein the support frame comprises at least one metal strut that is at least partially surrounded by the plastic of the support frame and/or of a plastic strut, and wherein the at least one metal strut has at least one cutout through which plastic material extends.

9. The cooling device according to claim 8,
wherein the grid supporting structure has at least one plate-shaped support element on the side of the grid supporting structure facing away from the roller blind in order to establish contact with the heat exchanger, and
wherein the at least one plate-like support element is arranged on the metal strut in the area of the cutout.

10. The cooling device according to claim 1, wherein the at least one plate-shaped support element is configured in one piece with a plastic strut of the grid supporting structure.

11. The cooling device according to claim 2, wherein at least one of the at least one support elements has a differently sized contact surface for the heat exchanger.

12. The cooling device according to claim 1, wherein a water cooler with cooling channels around which air can flow is arranged on the side of the apparatus facing away from the heat exchanger.

13. The cooling device according to claim 1, wherein the roller blind has a winding roller, which is rotatably mounted on the support frame.

14. A motor vehicle having an air intake opening at a front end, and the cooling device according to claim 1 that is associated with the air intake opening.

15. The cooling device according to claim 12, wherein the heat exchanger is an air-conditioning condenser.

* * * * *